United States Patent [19]

Harzer

[11] 3,753,105

[45] Aug. 14, 1973

[54] SYSTEM FOR VARYING AN OSCILLOSCOPIC TRACE

[75] Inventor: Peter Harzer, Eningen u.A., Germany

[73] Assignee: Wandel & Goltermann, Reutlingen, Germany

[22] Filed: Oct. 22, 1971

[21] Appl. No.: 191,921

[30] Foreign Application Priority Data
Oct. 22, 1970 Germany............... P 20 51 791.3

[52] U.S. Cl. .............................. 324/121 R, 315/22
[51] Int. Cl. .................................... G01r 13/20
[58] Field of Search .................. 324/121 R; 315/22, 315/23, 25

[56] References Cited
UNITED STATES PATENTS
2,625,667  1/1953  Chance ................................ 315/22
2,840,756  6/1958  Reeves ................................ 315/22
3,577,031  5/1971  Welsh .................................. 315/22

Primary Examiner—Rudolph V. Rolinec
Assistant Examiner—Ernest F. Karlsen
Attorney—Karl F. Ross

[57] ABSTRACT

The beam of a cathode-ray tube, normally suppressed, is electromagnetically deflected by a triangular current in the x direction and by a sinusoidal current in the y direction, thereby producing an invisible grid on the oscilloscope screen. Whenever the y-deflection signal matches either an input signal to be visualized or a selected reference signal, the beam is turned on for a small fraction of a y-sweep cycle to produce part of a luminous trace, representing the input signal, and a straight base line corresponding to the reference signal. In order to vary the position and/or the scale of representation of the trace with maintenance of its correct position relative to the base line, the y-deflection signal is subjected to multiplicative and/or additive modification.

9 Claims, 2 Drawing Figures

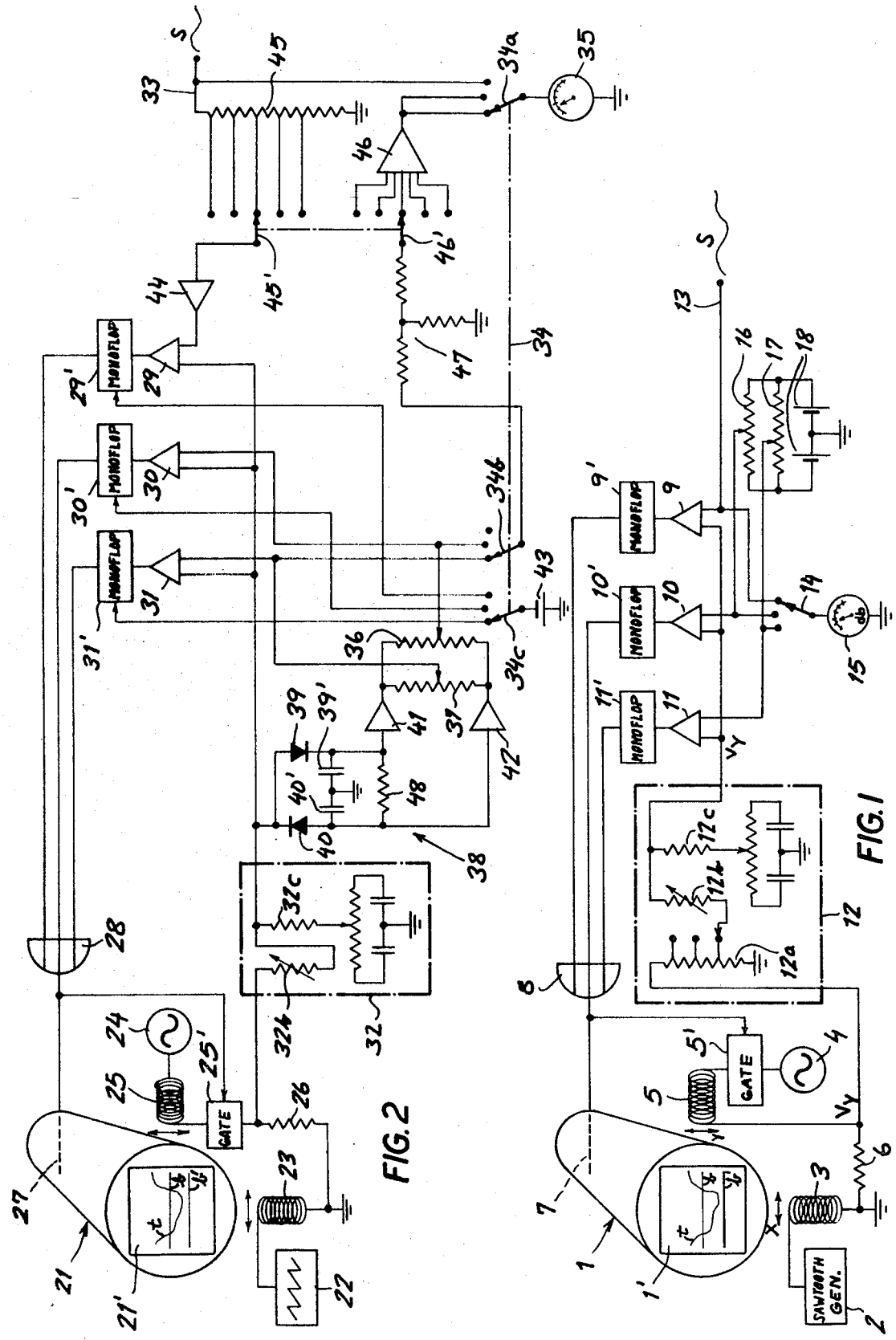

SYSTEM FOR VARYING AN OSCILLOSCOPIC TRACE

My present invention relates to a system for modifying the trace of an input variable, such as a signal voltage on the screen of an oscilloscope.

In several commonly owned U.S. Pats., including Nos. 3,461,385 and 3,584,295, means have been disclosed for energizing such a test circuit with a continuously varying test frequency, with conversion of the alternating output voltage into a d-c message signal indicating the attenuation and/or phase characteristic of the circuit throughout a selected frequency band. This message signal may be visually compared with a reference signal, e.g., as transmitted through a standard pad, by displaying both signals simultaneously or in rapid alternation on the luminescent screen of a cathode-ray tube.

A conventional oscilloscope suitable for this purpose has a first sweep circuit for deflecting the electron beam in an $x$ direction (hereinafter referred to for convenience as horizontal) at a relatively slow rate and a second sweep circuit for oscillating the beam in an orthogonally related $y$ direction (referred to as vertical) at a relatively fast rate, e.g., a rate of 1 to 20 kilocycles per cycle of horizontal deflection. The beam, which normally is kept suppressed, thus traces an imaginary raster or grid on the oscilloscope screen; whenever the message signal to be visualized corresponds to the instantaneous magnitude of the vertical deflection signal, as determined by a voltage or current comparator, the beam is momentarily turned on so as to produce a luminous dot on the screen. A succession of such dots during consecutive vertical sweeps traces a straight line or a curve representing the law of variation of the measured paramater as a function of time and/or frequency. Such an oscilloscope enables the simultaneous display of several functions derived from different test objects. In order to provide a sharp trace, the beam can be brightened only for a very small fraction of an oscillatory cycle of its vertical sweep, e.g., for a period of 50 to 100 ns, if the horizontal sweep has a repetition period of about 1 second.

In my copending application Ser. No. 143,499, filed May 14 1971, I have disclosed and claimed an improved sweep circuit for such an oscilloscope designed to enhance the brightness of the trace, without objectionable defocusing of the beam, by temporarily arresting the sweep in the vertical ($y$) direction during the brightening of the beam, advantageously for a period sufficient to let the resultant horizontal trace extend over about 10 to 50 times the diameter of the luminous spot produced by the beam. This period is, of course, only a small fraction of a vertical sweep cycle.

As further disclosed and claimed in my above-identified copending application, a set of two or more comparators may be used to brighten the beam (and to arrest the vertical sweep) whenever a voltage derived from the vertical-sweep circuit matches either an input voltage, representing the message signal to be visualized, or a fixed reference voltage establishing a horizontal base line. The tracing of that base line on the screen may be accompanied by a momentary acceleration of the sweep in the horizontal ($x$) direction whereby this line is generated in a single vertical-deflection cycle.

In such a system it is sometimes necessary to modify the trace of the input signal projected onto the screen, i.e., to expand or contract that trace and/or to shift it vertically across the screen. Thus, an expansion of the trace in the vertical direction may be needed to visualize minor signal variations whereas a contraction may be necessitated in the presence of large amplitude excursions. While this may be accomplished by multiplicatively and/or additively modifying the effective input voltage through adjustment of voltage dividers, amplifiers or biasing circuits, such adjustment requires immediate resetting of the system with the aid of a similarly modified external calibrating voltage in order to restore the proper relative position of the trace and the base line or lines.

The general object of my present invention is to provide means in such an oscilloscope system for varying the spread and/or the location of the trace with automatic maintenance of its position relative to one or more associated base lines.

A more particular object is to provide simple means for automatically holding the base line or base line within the field of view of the oscilloscope screen.

Still another object is to provide, in a system equipped with a suitably calibrated meter for monitoring the magnitudes of the input and reference voltages, means for distinctively visualizing the tracing which represents the voltage being monitored.

In accordance with the present invention, I provide adjustable impedance means in the connection between the $y$-sweep circuit and the comparison circuit whose output generates the input-signal trace and the base line or lines, thereby enabling joint variation of the appearance of the trace and of each base line in a correlated manner.

According to a more specific feature, the source of reference signal establishing the base line or lines may comprise a rectification network connected across the $y$-circuit for developing a sweep-dependent voltage ensuring the maintenance of each base line within the field of view.

The aforementioned calibrated meter may be selectively connectable to the source of input signal and to the source of reference signal for ascertainment of the actual magnitude of the instantaneous signal voltages, and of the reference voltages, or for a direct reading of a parameter (e.g., attenuation) related to the input signal.

The above and other features of my invention will be described in detail hereinafter with reference to the accompanying drawing in which:

FIG. 1 is a circuit diagram of a first embodiment of the invention; and

FIG. 2 is a similar diagram of a second embodiment.

The system shown in the drawing is broadly similar to that of my above-identified application Ser. No. 143,499 whose disclosure, insofar as relevant, is hereby incorporated by reference in the present application.

In FIG. 1, I have illustrated at 1' the screen of a cathode-ray tube 1 provided with a pair of electromagnetic coils (or yokes) 3, 5 for deflecting the beam of the tube in a horizontal direction ($x$) and a vertical direction ($y$), respectively. Coil 3 is energized at a relatively low frequency, e.g., of 1 Hz, by a sawtooth-wave generator 2. Coil 2 is energized at a substantially higher frequency, e.g., of one or several kHz, by a sine-wave oscillator 4 via a series resistor 6 which develops a voltage drop proportional to the magnitude of the deflecting current through the coil. Tube 1 further has a control grid 7 which is normally biased negatively to a substantial cutoff of the beam but can be driven positive by the output of an OR gate 8 with three inputs connected to respective comparison stages, each of these stages including a comparator 9, 10, 11 connected to a monoflop 9', 10', 11' to trip same for a predetermined period upon attainment of equality of the voltages applied to the two inputs of the comparator. The output of OR gate 8 may also be fed to a gate 5' in series with coil 5 to arrest the vertical deflection of the beam for the off-normal period of the actuated monoflop during which the beam of the tube 1 is turned on, with maintenance of the yoke current at substantially its momentary value as described in my copending application. These periods may have a duration of, say, 50 to 100 ns.

The first (right-hand) input of comparator 9 is connected to a lead 13 carrying a message signal S to be visualized, e.g., the output voltage of a test pad having a predetermined voltage applied thereto; if the frequency of the test voltage varies in step with the output of sawtooth generator 2, the instantaneous magnitude of input signal S may be considered a measure of the attenuation of the test pad for a particular frequency. As a standard for the evaluation of these instantaneous magnitudes, two fixed reference voltages are derived from potentiometers 16, 17 connected across a battery 18, these voltages being applied to the right-hand inputs of comparators 10 and 11, respectively. The second (left-hand) inputs of comparators 9–11 receive a voltage $v_y$ varying in step with the sweep voltage $V_y$ developed across resistor 6, this sweep voltage being modified in an impedance network 12 connected across that resistor. Network 12 is shown to include a first, stepwise variable resistor 12a for coarse adjustment of the comparison voltage $v_y$, a continuously variable resistor 12b in tandem with resistor 12a for fine adjustment, and a biasing circuit 12c for shifting the zero point of the modified sweep voltage with reference to ground, either continuously or in steps.

A voltmeter 15, which could be calibrated directly in decibels (db) in a system for measuring attenuation, is selectively connectable by way of a switch 14 to the right-hand input of any of the comparators 9–11. The reading obtained on meter 15 depends, of course, on the instantaneous value of input signal S as well as on the settings of potentiometers 16 and 17.

The periodic brightening of the beam of tube 1 under the control of comparator 9, with or without interruption of the vertical sweep, gives rise to a trace $t$ on screen 1' representative of signal S. At the same time, in response to the operation of comparators 10 and 11, two horizontal base lines $b$ and $b'$ are registered on the screen at levels established by the two potentiometers.

If it is desired to compress the amplitude range of trace $t$, resistances 12a and/or 12b in network 12 are adjusted to reduce the step-down ratio $V_y : v_y$ so that the response of comparator 9 takes place within a smaller spread of the beam sweep. An increase of that step-down ratio, conversely, magnifies the trace in the vertical direction. At the same time, the spacing of base lines $b$ and $b'$ from a zero reference line (not shown) on the screen is correspondingly reduced or increased. If circuit 12c is adjusted to shift the trace upwardly or downwardly, by diminishing or augmenting the voltage $v_y$, base lines $b$ and $b'$ undergo a like shift. In each case, therefore, the correct relative position of the trace and the base lines is preserved. The reading of meter 15 is, of course, unaffected by the adjustment of impedance network 12.

In FIG. 2 I have designated by 21 – 37 a number of elements respectively corresponding to elements 1 – 17 of FIG. 1; an individual description of most of these elements is therefore unnecessary. The discontinuously adjustable resistor 12a has no counterpart in the impedance network 32 of FIG. 2.

In this second embodiment, potentiometers 36 and 37 feeding the comparators 30 and 31 are connected across a voltage source 38, balanced with respect to ground, whose potential is proportional to the vertical sweep of the beam in tube 21. Voltage source 38, connected across the output of circuit 32, comprises a pair of oppositely poled diodes 39, 40 serving to charge a pair of capacitors 39', 40' to the positive and negative peak voltages of the sweep, these capacitors being part of an integrating circuit also including a resistor 48 connected thereacross. Isolating amplifiers 41 and 42 transmit the condenser potentials to opposite ends of the parallel-connected potentiometers 36 and 37, in lieu of the constant-voltage source 18 of FIG. 1.

Switch 14 of FIG. 1 has bee replaced in FIG. 2 by a three-level switch 34 with a first arm 34a connected to meter 35, a second arm 34b having two of its bank contacts connected to the right-hand inputs of comparators 30 and 31 (the third bank contact being unconnected), and an arm 34c connected to a biasing battery 43 and provided with three bank contacts tied to respective control electrodes of monoflops 29', 30', 31'. Upon the establishment of a connection from battery 43 to the control electrode of any monoflop, the off-normal or operating period of that monoflop is extended (i.e., doubled) to intensify the corresponding trace on screen 21' as indicated for the base line $b'$ in FIG. 2.

Input lead 33 is connected directly to an associated bank contact of switch level 34a whereas the sliders of potentiometers 36 and 37 are connectable to the other two bank contacts of that level via corresponding bank contacts of level 34b, a damping circuit 47 and a variable-gain amplifier 46. The fixed attenuation of circuit 47 is numerically equal to the fixed gain of an amplifier 44, inserted between signal lead 33 and the corresponding input of comparator 29, whereas the gain of amplifier 46 exactly compensates for the voltage reduction by a potentiometer 45 in series with amplifier 44; the slider 45' of potentiometer 45, which replaces the variable resistance 12a of FIG. 1, is mechanically ganged with a wiper 46' in the input of amplifier 46 enabling a joint variation of the complementary step-down and step-up ratios in incremental and therefore exactly calibratable steps.

Thus, the presence of amplifier 44 enables small variations in signal S to be sufficiently magnified for a dependable response of comparator 29, yet the insertion of the complementary damping network 47 in the input circuit of meter 35 establishes the correct meter reading in any position of switch 34. This reading is also unaffected by a resetting of potentiometer 45 in view of the compensatory effect of amplifier 46. The tracing of the base lines $b$ and $b'$ on the oscilloscope screen may be performed in the manner disclosed in my copending application, i.e., with acceleration of the horizontal sweep established by sawtooth generator 2 or 22.

In the switch position illustrated in FIG. 2, meter 35 monitors the base line $b'$ traced under the control of comparator 31 and potentiometer 37, this base line being intensified by the lengthening of the off-normal period of the associated monoflop 31'. Evidently, the two other tracings $b$ and $t$ may be similarly intensified in the alternate positions of switch 34.

The operating frequency of oscillator 4 or 24 should be high compared to the highest frequency of input signal S; sawtooth-voltage generator 2 or 22 may be adjustable to different operating frequencies corresponding to different "wobbling" cycles during which the measuring frequency is progressively varied. The modulating voltage emitted by this generator could also be symmetrically triangular, instead of sawtooth-shaped, to produce alternate forward and reverse sweeps.

I claim:

1. In an oscilloscope, in combination:
    a cathode-ray tube provided with a screen and with an electron gun for training a beam upon said screen;
    a first sweep circuit for displacing said beam in an x direction at a relatively slow rate;
    a source of reference signal providing a standard of evaluation for said input signal;
    a second sweep circuit for oscillating said beam at a relatively fast rate in a y-direction orthogonal to said x-direction, said source of reference signal including rectifier means connected across said second sweep circuit for developing a supply voltage dependent upon the sweep in said y-direction;
    brightness-control means for normally keeping said beam substantially suppressed;
    a source of input signal to be graphically represented on said screen;
    comparison means connected to said second sweep circuit and to said sources for briefly operating said brightness-control means to brighten said beam upon the deflection of the beam in said y-direction bearing a predetermined relationship to the output of either of said sources, thereby generating on said screen a visible trace of said input signal and a visible base line; and
    adjustable impedance means in the connection between said comparison means and said second sweep circuit for jointly varying the appearance of said trace and said base line in a correlated manner, said impedance means lying between said second sweep circuit and said rectifier means.

2. The combination defined in claim 1, further comprising reading means provided with switchover means for selectively connecting same to either of said sources and setting means in said source of reference signal for varying the magnitude of said reference signal as determined by said reading means.

3. In an oscilloscope, in combination:
    a cathode-ray tube provided with a screen and with an electron gun for training a beam upon said screen;
    a first sweep circuit for displacing said beam in an x-direction at a relatively slow rate;
    a second sweep circuit for oscillating said beam at a relatively fast rate in a y-direction orthogonal to said x-direction;
    a source of input signal to be graphically represented on said screen;
    at least one source of reference signal responsive to said second sweep circuit for providing a standard of evaluation for said input signal;
    at least two comparators with first inputs connected in parallel to said second sweep circuit and with second inputs respectively connected to said sources;
    brightness-control means connected to said comparators for keeping said beam normally suppressed but for briefly brightening same upon the deflection of the beam in said y-direction bearing a predetermined relationship with the output of either of said sources, thereby generating on said screen a visible trace of said input signal and at least one visible base line; and
    adjustable impedance means in the connection between said first inputs and said second sweep circuit for jointly varying the appearance of said trace and said base line in a correlated manner.

4. The combination defined in claim 3 wherein said source of reference signal includes rectifier means connected across said second sweep circuit for developing a supply voltage dependent upon the sweep in said y-direction.

5. The combination defined in claim 3, including two sources of reference signal and three comparators for generating two visible base lines on said screen, further comprising reading means for said input and reference signals, switch means for selectively connecting said reading means to any one of said second inputs to register the magnitude of the respective signal, and intensifying means for said brightness-control means coupled with said switch means for individually increasing the brightness of said trace and of said base lines in corresponding positions of said switch means.

6. The combination defined in claim 5 wherein said comparators include timing means for measuring an operating period for said brightness-control means, said intensifying means being actuatable by said switch means for selectively applying to any one of said comparators a control signal lengthening said operating period.

7. The combination defined in claim 6 wherein said timing means is connected to said second sweep circuit for interrupting the displacement of the beam in said y direction during said operating period.

8. The combination defined in claim 3, further comprising adjustable amplifier means inserted between said source of input signal and the second input of one of said comparators, complementarily adjustable attenuation means ganged with said adjustable amplifier means and connected to the second input of the other of said comparators, reading means for said input and reference signals, and switch means for connecting said reading means directly to the second input of said one of said comparators in a first position and to the second input of said other of said comparators through said attenuation means in another position.

9. The combination defined in claim 8 wherein said adjustable amplifier means and said adjustable attenuation means are provided with incremental step-down means and incremental step-up means, respectively.

* * * * *